United States Patent [19]

Tedder, deceased et al.

[11] 3,895,580

[45] July 22, 1975

[54] BAND PASS INTEGRATOR FOR PROXIMITY FUSES

[75] Inventors: Paul M. Tedder, deceased, late of Gainesville, Fla.; by Yvonne M. Tedder, administrator, Gainesville, Fla.

[73] Assignee: The United States of America as represented by the Secretary of the Army, Washington, D.C.

[22] Filed: Oct. 17, 1957

[21] Appl. No.: 690,880

[52] U.S. Cl. .......................... 102/70.2 P; 328/127

[51] Int. Cl. .......................... F42c 13/04

[58] Field of Search .................. 250/27 I; 328/127; 102/70.2 P

[56] References Cited

UNITED STATES PATENTS

| | | | |
|---|---|---|---|
| 2,509,910 | 5/1950 | Dike | 102/70.2 P |
| 2,704,326 | 3/1955 | Whitson et al. | 328/128 |

*Primary Examiner*—Maynard R. Wilbur
*Assistant Examiner*—Richard E. Berger
*Attorney, Agent, or Firm*—Nathan Edelberg; Robert P. Gibson; Saul Elbaum

EXEMPLARY CLAIM

1. A band pass integrator circuit for a proximity fuze comprising in combination: low frequency cutoff means located at the input of said circuit, first diode means for clamping at ground potential the positive peaks of an input signal applied to the input of said circuit, second diode and resistor means for providing partial clamping of the negative peaks of an input signal applied to the input of said circuit, said partial clamping causing said circuit to be desensitized in the presence of high frequency and high amplitude input signals, a capacitor charged to an initial voltage, said proximity fuze functioning when said capacitor discharges to a predetermined voltage, third diode means for causing the positive peaks of an input signal within the pass band of said circuit to discharge said capacitor, said capacitor discharging to said predetermined voltage when the positive peaks of an input signal within said pass band have a predetermined minimum value for a predetermined minimum time, and capacitor means connected to said third diode means to make said third diode means inoperable at frequencies outside of said pass band.

2 Claims, 1 Drawing Figure

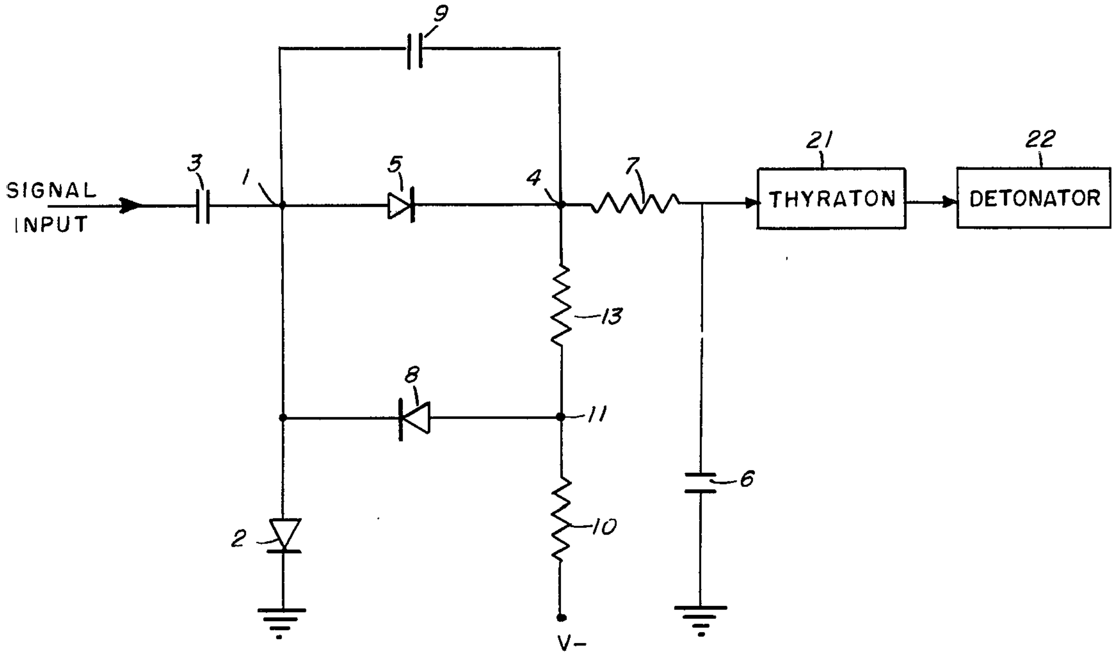
INVENTOR
Paul M. Tedder, deceased
by: Yvonne M. Tedder, Administratrix
by:
W. E. Thibodeau, T. J. Lynch, F. E. McGee & J. D. Edgerton

BAND PASS INTEGRATOR FOR PROXIMITY FUSES

The invention described herein may be manufactured and used by or for the Government for governmental purposes without the payment to me of any royalty thereon.

This invention relates to electronic ordnance proximity fuzes, and more particularly to a circuit for improving fuze performance.

In any fuze system it is highly desirable to eliminate the adverse effects of noise and prevent external jamming from interfering with proper fuze operation. The prior art has recognized the need for providing these characteristics but have found them difficult to obtain. The prior art has devised circuitry which partially provides these characteristics but such circuitry has been complex, bulky and not entirely adequate.

It is an object of this invention, therefore, to provide a simple circuit for a proximity fuze which will eliminate the adverse effects of noise and prevent external jamming from interfering with fuze operation.

Another object of the invention is to provide a circuit having the above characteristics which also provides a controllable delay between target recognition and fuze detonation to improve the missile burst position.

The present invention accomplishes these objects by means of a simple non-linear circuit which is adapted to operate as a band pass integrator.

The specific nature of the invention, as well as other objects, uses, and advantages thereof, will clearly appear from the following description and from the accompanying drawing, in which:

The drawing is a schematic diagram of a band pass integrator circuit for a doppler proximity fuze in accordance with the invention.

Referring to the drawing, a capacitor 6, in the absence of signal input, charges to the negative voltage V− through the resistors 10, 13 and 7. The voltage across the capacitor 6 is applied to the grid of a thyratron 21 in the fuze firing circuit. When reception of the proper doppler input signal causes the negative potential on the capacitor 6 to fall to a value close to zero volts, the thyratron 21 will fire causing a detonator 22 to detonate the missile. To prevent firing when the fuze circuitry is initially turned on, the thyratron plate voltage may be withheld until the capacitor 6 can be charged to the negative voltage V−.

The signal input, which is a conventional doppler wave well known in the art is applied to a junction 1 through a capacitor 3. The value of the capacitor 3 is adjusted to provide the desired low frequency cutoff. A diode 2 having its plate connected to the junction 1 and its cathode grounded, clamps the positive peaks of the doppler wave at ground potential. The effect of this clamping is to make the band pass integrator circuit shown in the drawing independent of the amplitude of the signal input. A diode 8 having its cathode connected to the junction 1 and its plate connected to the junction 11 of the resistors 10 and 13 serves as a partial negative clamp. This partial negative clamp acts to desensitize the circuit in the presence of high frequency or high amplitude signals. A diode 5 has its plate connected to the junction 1 and its cathode connected to the junction 4 between resistors 7 and 13. This diode 5 permits the positive peaks of the doppler signal input to periodically discharge the negative voltage on the capacitor 6. A capacitor 9 connected in parallel with the diode 5 provides high frequency cutoff. The value of the capacitor 9 is proportioned to the back resistance of the diode 5 so that its bypassing action is only effective toward the high frequency end of the doppler range.

It will now be shown how the circuit in the drawing operates to eliminate noise, prevent jamming and provide a controllable burst position.

In the absence of signal input the capacitor 6 charges up to V−. The junctions 4 and 1 will also be at V−. This value might be slightly reduced by the back leakage of the diode 2. To cause functioning, the signal input must first be sufficient to overcome the bias V−, thereby driving the junction 1 to zero volts. Secondly, the signal input must be within the passband of the circuit. The capacitor 3 provides low frequency cutoff and high frequency signals are bypassed by the capacitor 9. Finally, the signal input must be present for a minimum length of time, regardless of amplitude, in order to cause functioning. That is, the input signal must maintain the average voltage at the junction 4 sufficiently small for a sufficent time to cause the negative voltage on the capacitor 6 to discharge to a predetermined potential which triggers thyratron 21.

Noise and jamming signals outside of the pass band are eliminated by the capacitors 3 and 9. Noise and jamming signals within the pass band are counteracted also. As can be seen from the previous paragraph, the noise and jamming signals must have very special characteristics in order to cause functioning. Because of the clamping action of the diode 2, positive peaks of input signals above a predetermined value are clamped at ground potential. Consequently, the width of the positive peaks of the input signal, and not the amplitude, is more effective in discharging the capacitor 6. Therefore, high amplitude noise pulses within the pass band, because of their narrow width, will not be able to cause fuze functioning.

Further elimination of unwanted signals is provided by the partial negative clamping of the diode 8 and the resistor 10. This partial clamping makes the junction 11 more negative as either the amplitude or the frequency of the input signal increases. This decreases circuit sensitivity in the presence of high amplitude or high frequency signals. Since noise is ordinarily scattered throughout the frequency spectrum, high frequency noise will be present simultaneously with noise which is within the pass band. The high frequency noise therefore will desensitize the circuit so that signals from the target will ride on the noise and be able to operate the circuit as if the noise were not there at all.

The minimum length of time that a signal input must be present to cause the capacitor 6 to discharge to a predetermined firing potential is determined by the discharging and charging paths of the capacitor 6. The charging path is through the resistors 10, 13, and 7, and the discharging path is through the resistor 7, the small forward resistance of the diode 5, and the output impedance of the signal input. By adjusting these charging and discharging paths, a desired minimum time that the signal is required to be present can be chosen. Since this minimum time can be controlled, a controllable delay between target recognition and fuze detonation can readily be provided.

It has been shown that the band pass integrator circuit of this invention is operable only by signals within the pass band, having positive peaks which are greater than a predetermined minimum amplitude, and are present for a predetermined minimum time regardless of amplitude. Noise and jamming signals ordinarily will not have such characteristics and thus will not affect circuit operation. Desensitizing means are used to further increase the rejection of unwanted signals. In addition, this circuit is readily able to provide a controllable burst position to obtain maximum missile damage. These characteristics are provided by a simple circuit requiring only a small number of readily available components which can be ruggedly adapted for fuze operation.

It will be apparent that the embodiments shown are only exemplary and that various modifications can be made in construction and arrangement within the scope of the invention as defined in the appended claims.

I claim as my invention:

1. A band pass integrator circuit for a proximity fuze comprising in combination: low frequency cutoff means located at the input of said circuit, first diode means for clamping at ground potential the positive peaks of an input signal applied to the input of said circuit, second diode and resistor means for providing partial clamping of the negative peaks of an input signal applied to the input of said circuit, said partial clamping causing said circuit to be desensitized in the presence of high frequency and high amplitude input signals, a capacitor charged to an initial voltage, said proximity fuze functioning when said capacitor discharges to a predetermined voltage, third diode means for causing the positive peaks of an input signal within the pass band of said circuit to discharge said capacitor, said capacitor discharging to said predetermined voltage when the positive peaks of an input signal within said pass band have a predetermined minimum value for a predetermined minimum time, and capacitor means connected to said third diode means to make said third diode means inoperable at frequencies outside of said pass band.

2. A pass band integrator circuit for a proximity fuze comprising in combination: a signal input terminal, a first capacitor connected in series with said input terminal, said first capacitor providing low frequency cutoff for said circuit, a first junction to which said first capacitor is connected, a positive clamping diode having its plate connected to said first junction and its cathode connected to circuit ground, a second junction, a partial negative clamping diode having its cathode connected to said first junction and its plate connected to said second junction, a negative voltage, a partial negative clamping resistor connected between said negative voltage and said second junction, a third junction, a discharging diode having its plate connected to said first junction and its cathode connected to said third junction, a second capacitor connected in parallel with said discharging diode, said capacitor providing high frequency cutoff for said circuit, a first resistor having one end connected to said second junction and the other end connected to said third junction, an output terminal, a second resistor having one end connected to said output terminal and the other end connected to said third junction, and a capacitor having one end connected to said output terminal and the other end connected to circuit ground, said capacitor being initially charged to said negative potential, said proximity fuze functioning when said capacitor discharges to a predetermined voltage, said capacitor being discharged to said predetermined voltage when an input signal within the pass band determined by said first and second capacitors is applied to said input terminal for a predetermined minimum time, the positive peaks of said input signal having a predetermined minimum amplitude for said predetermined time.

* * * * *